April 14, 1931.　　　T. M. FINLEY　　　1,800,614
PROPELLER PUSH ROD OR TUBE AND SLIDE TRANSMISSION
Filed July 13, 1927　　　3 Sheets-Sheet 1
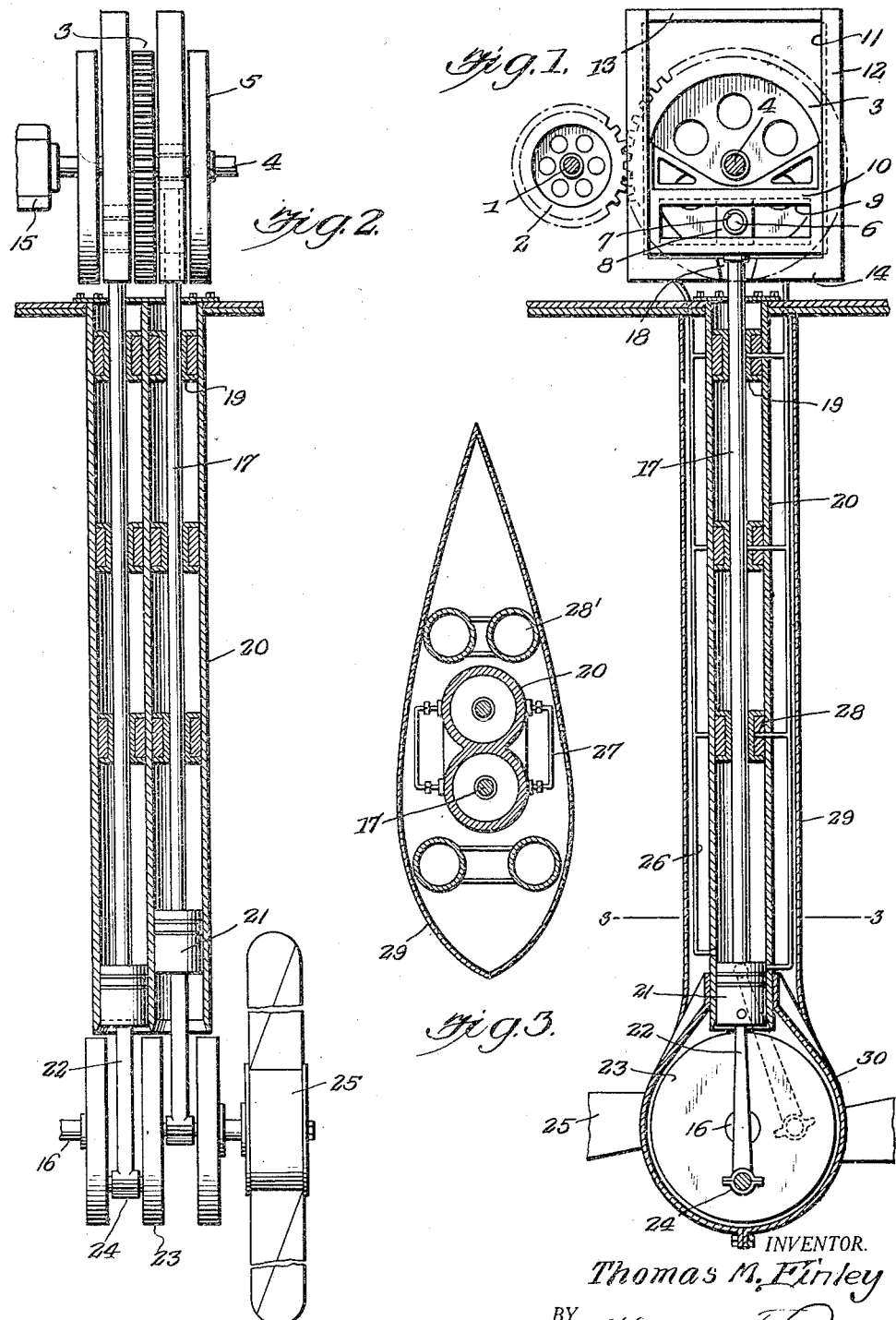
INVENTOR.
Thomas M. Finley
BY Harry T. Riley
ATTORNEY.

April 14, 1931. T. M. FINLEY 1,800,614
PROPELLER PUSH ROD OR TUBE AND SLIDE TRANSMISSION
Filed July 13, 1927 3 Sheets-Sheet 2

INVENTOR.
Thomas M. Finley.
BY Harry T. Riley
ATTORNEY.

April 14, 1931.   T. M. FINLEY   1,800,614
PROPELLER PUSH ROD OR TUBE AND SLIDE TRANSMISSION
Filed July 13, 1927   3 Sheets-Sheet 3

Fig. 5.

Inventor
Thomas M. Finley,
By Harry T. Riley
Attorney

Patented Apr. 14, 1931

1,800,614

UNITED STATES PATENT OFFICE

THOMAS M. FINLEY, OF ST. LOUIS, MISSOURI

PROPELLER PUSH ROD OR TUBE AND SLIDE TRANSMISSION

Application filed July 13, 1927. Serial No. 205,439.

The invention relates to a propeller push rod or tube and slide transmission.

It has been found that it is very beneficial to all classes of aircraft to reduce parasite resistance by placing the motors inside the fuselage or inside the hull of the machine and exposing only the propellers and driving means of the same to the open air.

Under the old plan of a revolving shaft and gears for transmitting motion from the motor to the propeller, there are many evils that largely dissipate the benefits derived from such an arrangement. Aeronautical motors are both powerful and fast, and to transmit the power from them with their excessive speed through a revolving shaft and gears requires a very heavy shaft in order to sustain the terrific strain. It also requires bearings that are difficult to oil and to keep cool in their inaccessible positions, while at the propeller there necessarily must be placed gears of some kind which are inaccessible, noisy, sustain great strains and wear, and are wholly undependable, and besides these, there is also a heavy loss of power sustained in the transmission of same through such gearing.

It is an object of the present invention to provide a simple, practical and efficient propeller slide and push rod transmission of strong, durable and comparatively inexpensive construction adapted to be used without heavy revolving shafts and the weight, wear and heat incident to the same, and to dispense with all gears at the propellers, and at the same time enable the motor or motors to be located within the hull or fuselage, with the slide mechanism for converting the rotary motion of the motor into a reciprocating motion easily accessible for lubrication, adjustments, repairs, and so forth.

A further object of the invention is to eliminate the troublesome gears and the wear and noise and strain incident to the use of such gearing, and to substitute therefor two relatively light push rods or tubes in which the stresses are tension and compression only.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction within the scope of the claims may be resorted to without departing from the spirit or sacrificing any of the advantages of the invention.

In the drawings:—

Figure 1 is a longitudinal sectional view, partly in elevation, of a propeller slide transmission constructed in accordance with this invention.

Fig. 2 is a similar view taken at right angles to Fig. 1, the casing being omitted Fig. 3 is a transverse sectional view, taken substantially on the line 3—3 of Fig. 1.

Fig. 5 is an enlarged elevation partly in section of the structure shown in Fig. 4.

Figure 4:
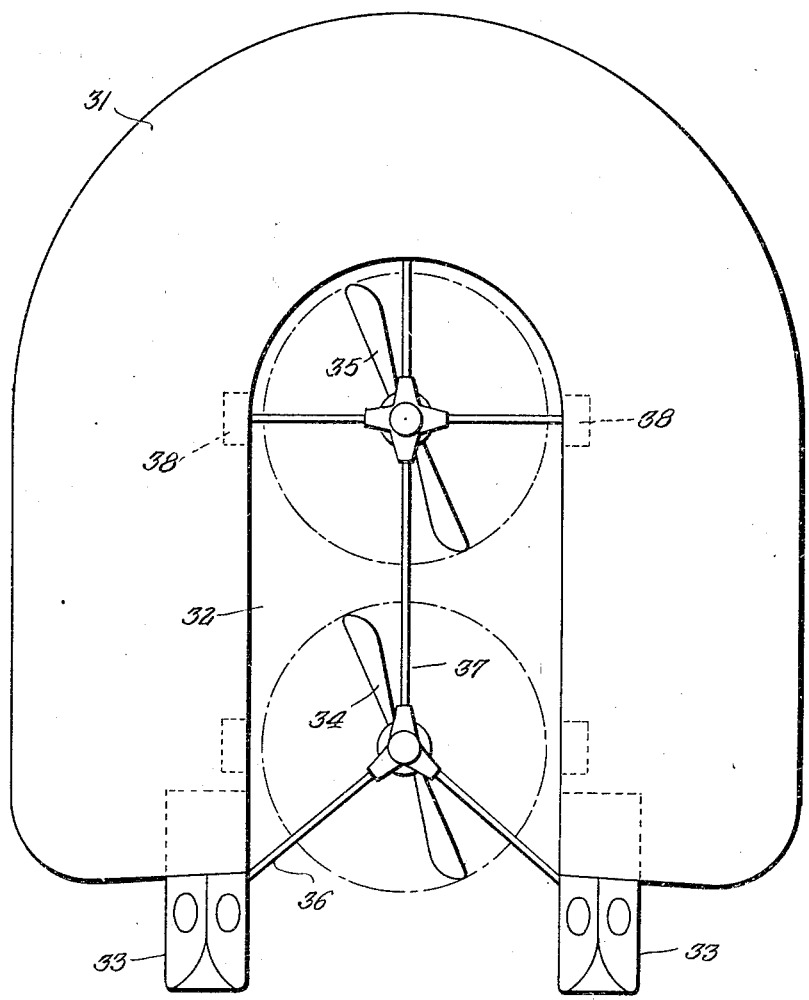
Fig. 4 is a front elevation of a flying machine provided with propeller slide transmissions, constructed in accordance with this invention.

In the accompanying drawings in which is illustrated the preferred embodiment of the invention, 1 designates a motor shaft provided with a gear wheel 2 which meshes with a centrally arranged relatively large gear wheel 3 of a shaft 4 of the propeller slide transmission. The shaft for the propeller slide transmission has mounted on it at opposite sides of the centrally arranged gear wheel 3, fly wheels 5 having wrist pins 6 which are eccentrically connected with the gear wheel 3 and which are arranged in a bearing 7 of a transversely movable slide 8 operating in a transverse guide 9 of the slidable cross head 10. The gear wheel 3 and the fly wheels 5 constitute crank elements and the wrist pins 6 are arranged at an angle of 90°. The slidable cross heads operate in guide grooves 11 of side members 12 of substantially rectangular guiding frames. The guiding frames are each composed of parallel side bars 12 and upper and lower transverse connecting bars 13 and 14. While the connecting bars 13 and 14 are arranged at the top and bottom of the guiding frames as illustrated in Figs. 2 and 3 of the drawings, it will be understood that the propeller slide transmission may be disposed in the vertical horizontal or in inclined or angular position as hereinafter fully explained. The transverse slide, the longitudinally slidable cross head and the guiding frame and the eccentric elements are designed to be constructed substantially as shown and described in my copending application, Serial No. 121,441 filed July 9, 1926 and no claim is made in the present application to the particular construction and arrangement of the slide transmission mechanism, per se, as such invention forms the subject matter of the said copending application.

At the left hand side of the upper portion of Fig. 2 of the drawing is illustrated a portion of a motor 15, but it will be apparent that any type of motor having a rotary power shaft may be employed and the present invention will transmit the power from such motor to a propeller shaft 16 without employing the gearing ordinarily used for accomplishing this result. When the motor shaft rotates the gear wheel 2 which is suitably fixed to the motor shaft is rotated and transmits rotary motion to the gear wheel 3 which constitutes the intermediate crank element of the propeller slide transmission. The gear wheel 3 rotates the shaft 4 with the crank elements or fly wheels 5 and the wrist pins which connect the central and side crank elements reciprocate the slide 8 transversely of the guiding frame and simultaneously reciprocate the cross head 10 longitudinally converting the rotary motion of the shaft 4 into a reciprocating motion of the cross heads. The arrangement of the wrist pins at an angle of 90° and the momentum of the fly wheels and the centrally arranged gear wheel which is a combined gear wheel and fly wheel results in a uniform continuous rotary movement of the shaft and reciprocating movement of the cross heads.

The cross heads of the slide transmission devices are connected to the upper ends of push rods or shafts 17 which extend through openings 18, the bottom connecting bars or members 14 of the guiding frames and the said push rods or shaft 17 which are reciprocated by the cross heads 10 may have their upper ends rigidly secured to the cross heads in any desired manner. The reciprocating push rods 17 operate in spaced guides 19 arranged at intervals within twin cylinders 20 and the lower ends of the push rods are equipped with heads 21 similar in construction to piston heads and connected by a pitman 22 with crank elements of the propeller shaft 16. While the propeller shaft 16 may be provided with crank bends in the accompanying drawings central and side fly wheels 23 are employed having connecting wrist pins 24 arranged approximately at an angle of 90°. The propeller shaft 16 in the accompanying drawings is shown in sections, the fly wheels and the wrist pins forming the connecting means between the sections of the propeller shaft and the propeller 25 is mounted on the propeller shaft in the usual manner at one end thereof. The guides 19 which may be of any desired number and of any preferred construction guide the push rods and prevent lateral movement of the same and enable the push rods to reciprocate smoothly and uniformly without liability of being swung under compression strain and the heads or pistons 21 and the guides 19 are lubricated by means of longitudinally disposed tubes 26 located at opposite sides of the cylinders and connected by transverse branch tubes 27 with the cylinders. The bottom branch tubes terminate at the inner faces of the cylinders and the upper and intermediate branch tubes which lubricate the guides have extensions 28 which extend to the inner guiding faces of the said guides and supply lubricant to the same and to the push rods.

The twin cylinders and the lubricating means are designed to be mounted within a suitable supporting frame having tubular frame members 28 as illustrated in Fig. 3 of the drawings and the supporting frame or framework is housed within a stream line casing 29 of tubular formation and preferably composed of two sides converging at the front ends to a point and having the rear portions curved inwardly and united in rear of the framework. The stream line tubular casing which is adapted to reduce the air resistance to a minimum and protect the push rod mechanism is provided at the lower end with a cylindrical casing 30 which houses the fly wheel crank elements of the propeller shaft.

In Fig. 4 of the accompanying drawings, the propeller slide and push rod transmission is indicated as applied to an airship comprising a body 31 having a longitudinal channel or passage 32 and provided at the bottom of the body at opposite sides of the channel or passage with fuselages 33 in which are arranged the motors for operating driving propellers 34 and 35 arranged one above the other at the passage or channel of the body of the flying machine. The slide transmissions shown in Fig. 4 are arranged at an acute angle to each other and are connected with the shaft of the lower propeller 34. A central vertical brace 37 connects the housing of the upper and lower propellers 34 and braces the same.

The casings 36 and 37 illustrated in Fig. 4 of the drawings are stream line casings corresponding in construction to the stream line casing illustrated in Fig. 3 of the drawing. The lower casings 36, which are arranged at an acute angle to each other, extend downwardly and outwardly from the shaft of the lower propeller 34 to the fuselage 33, as diagrammatically illustrated in Fig. 4 of the drawing. Also the upper propeller is connected by opposite horizontal propeller slide transmissions with motors 38 located within the body of the airship or flying machine at opposite sides of the channel or passage as illustrated diagrammatically in Fig. 4, and it will be clear from Fig. 4 of the drawings that the propellers may be supplied with power from one or a plurality of motors and that the motors may be arranged close to the propellers in the most advantageous position and that the propeller slide transmissions may be disposed at any angle with relation to the propeller shaft.

What is claimed is:

1. In a propeller slide transmission, the combination with a propeller shaft provided with crank elements, of a pair of reciprocating push rods, means for guiding the same, pitmen connecting the rods at one end with the crank elements of the propeller shaft, and a pair of slide transmission devices comprising longitudinally slidable cross heads connected to the other ends of the push rods, transversely movable slides carried by and guided on the cross heads, by wheels located at the outer sides of the transmission devices, a gear located between the said devices, and wrist pins eccentrically connecting the fly wheels and the gear wheel and actuating the said slides.

2. In mechanism of the class described, the combination of a pair of slide transmission devices arranged side by side and comprising longitudinally slidable cross heads, transversely movable slides carried by and guided on the cross heads and motor operated eccentric elements connected with and actuating the slides, a pair of push rods rigidly connected at one end with and reciprocated by the cross heads, means for connecting the other ends of the push rods with a propeller shaft for rotating the same, and a pair of continuous cylinders receiving the push rods and provided with spaced guiding means for the same.

3. In mechanism of the class described, the combination of a pair of slide transmission devices comprising longitudinally slidable cross heads, transversely movable slides carried by and guided on the cross heads and motor operated eccentric elements connected with and actuating the slides, a pair of push rods connected at one end with and reciprocated by the cross heads, means for connecting the other ends of the push rods with a propeller shaft for rotating the same, and spaced guides arranged within the cylinders and receiving and guiding the same.

4. In mechanism of the class described, the combination of a pair of slide transmission devices comprising longitudinally slidable cross heads, transversely movable slides carried by and guided on the cross heads and motor operated eccentric elements connected with and actuating the slides, a pair of push rods connected at one end with and reciprocated by the cross heads, heads carried by the other ends of the push rods, a pair of cylinders receiving the push rods, the said heads having a sliding fit in the cylinders, spaced guides arranged within the cylinders and receiving and guiding the push rods, longitudinal lubricating tubes having branch tubes connected with the cylinders for supplying lubricant to the same and the guides for lubricating the push rods and the heads, and means for connecting the heads with a shaft for rotating the same.

5. In mechanism of the class described, the combination of a pair of reciprocating push rods provided at one end with heads, cylinders receiving the push rods and in which the heads have a sliding fit, a propeller shaft having crank elements consisting of spaced fly wheels and wrist pins connecting the fly wheels, and pitmen connecting the heads with the wrist pins.

6. In mechanism of the class described, the combination of a pair of reciprocating push rods provided at one end with heads, cylinders receiving the push rods and in which the heads have a sliding fit, a propeller shaft having crank elements consisting of spaced fly wheels and wrist pins connecting the fly wheels, pitmen connecting the heads with the wrist pins, and tubular casings stream line in cross section housing the cylinders and having a cylindrical end section receiving the said crank elements.

7. In mechanism of the class described, the combination with a propeller shaft, of a plurality of pairs of propeller slide transmissions arranged at an angle to each other and each including a pair of reciprocating push rods, means for guiding the same, pitmen connecting the push rods with the propeller shaft, and motor actuated means for reciprocating the push rods.

8. In mechanism of the class described, the combination with a propeller shaft, of a plurality of pairs of propeller slide transmissions arranged at an angle to each other and each including a pair of reciprocating push rods, means for guiding the same, pitmen connecting the push rods with the propeller shaft, motor actuated means for reciprocating the push rods, and tubular casings stream line in cross section housing the push rods.

In testimony whereof I affix my signature.

THOMAS M. FINLEY.